United States Patent
Knittel et al.

(10) Patent No.: US 8,096,183 B2
(45) Date of Patent: Jan. 17, 2012

(54) METHOD AND ULTRASONIC SENSOR FOR DETERMINING THE HEIGHT OF OBJECTS DISPOSED ON A CONVEYING DEVICE

(75) Inventors: Thomas Knittel, Waldsee (DE); Jens Scherer, Mannheim (DE)

(73) Assignee: PEPPERL + FUCHS GmbH, Mannheim (DE)

( * ) Notice: Subject to any disclaimer, the term of this patent is extended or adjusted under 35 U.S.C. 154(b) by 425 days.

(21) Appl. No.: 12/499,132

(22) Filed: Jul. 8, 2009

(65) Prior Publication Data

US 2010/0005889 A1 Jan. 14, 2010

(30) Foreign Application Priority Data

Jul. 11, 2008 (EP) .................................... 08012610

(51) Int. Cl.
*G01N 29/07* (2006.01)
(52) U.S. Cl. ................. 73/597; 73/599; 73/602; 73/609
(58) Field of Classification Search ............ 73/597, 73/602, 579, 599, 609, 622, 627
See application file for complete search history.

(56) References Cited

U.S. PATENT DOCUMENTS 4,229,796 A * 10/1980 Garrett ........................ 702/39
(Continued)

FOREIGN PATENT DOCUMENTS

EP    0 571 913 A2   12/1993
JP    406032437   *   2/1994

OTHER PUBLICATIONS

European Search Report, Application No. EP 08 01 2610, Completion Date Jan. 20, 2009, pp. 1-2.

*Primary Examiner* — J M Saint Surin
(74) *Attorney, Agent, or Firm* — John A. Merecki; Hoffman Warnick LLC (57) ABSTRACT

The present invention relates to a method for determining the height of objects disposed on a conveying device, in which an ultrasonic sensor positioned in a specific relationship to the conveying device repetitively transmits ultrasonic pulses directed toward the conveying device and any objects disposed thereon to be detected, wherein the ultrasonic pulses are then reflected from a surface of the conveying device or from surfaces of the objects to be detected and are detected by the ultrasonic sensor, wherein from the moments of transmission and moments of detection of the ultrasonic pulses, delay times of the ultrasonic pulses are determined and the height of an object surface relative to the surface of the conveying device is determined from the delay times of the ultrasonic pulses reflected from a surface of an object. The method is characterized in that the delay time of the ultrasonic pulses reflected from the surface of the conveying device is stored as a reference value, that when there is an increase in the measured delay time from a lower to a higher value, the higher value is stored and used as a new reference value, that when there is a decrease in the measured delay time from a higher to a lower value, the lower value is interpreted as the delay time value of ultrasonic pulses reflected from an object surface, and that the height of the object surface relative to the surface of the conveying device is determined from a difference between the most recently stored reference value and a delay time value relevant to an object surface. The invention also relates to an ultrasonic sensor.

10 Claims, 5 Drawing Sheets

U.S. PATENT DOCUMENTS

| | | |
|---|---|---|
| 4,875,198 A | 10/1989 | Ariav |
| 5,220,536 A | 6/1993 | Stringer et al. |
| 5,672,815 A | 9/1997 | Prutu |
| 5,761,155 A | 6/1998 | Eccardt et al. |
| 6,897,465 B2 * | 5/2005 | Remillard et al. ....... 250/559.38 |
| 7,945,821 B2 * | 5/2011 | Ohishi et al. .................. 714/700 |
| 2009/0007678 A1 * | 1/2009 | Fukutomi et al. ................ 73/598 |
| 2011/0061464 A1 * | 3/2011 | Yi-Min .......................... 73/597 |

* cited by examiner

METHOD AND ULTRASONIC SENSOR FOR DETERMINING THE HEIGHT OF OBJECTS DISPOSED ON A CONVEYING DEVICE

FIELD OF THE INVENTION

The present invention relates to a method and ultrasonic sensor for determining the height of objects disposed on a conveying device.

RELATED ART

In a generic process for determining the height of objects disposed on a conveying device, an ultrasonic sensor positioned in a specific relationship to the conveying device, more particularly above the conveying device, transmits repetitively ultrasonic pulses directed toward the conveying device and any objects disposed thereon to be detected. The ultrasonic pulses are then reflected from a surface of the conveying device or surfaces of the objects to be detected and are detected by the ultrasonic sensor. From the moments of transmission and moments of detection of the ultrasonic pulses, delay times of the ultrasonic pulses are determined and the height of an object surface relative to the surface of the conveying device is determined from the delay times of the ultrasonic pulses reflected from a surface of an object.

A generic ultrasonic sensor for determining the height of objects disposed on a conveying device comprises a transmitter for transmitting repetitively ultrasonic pulses and a receiver for receiving ultrasonic pulses reflected from a surface of the conveying device or from surfaces of the objects to be detected. Furthermore, a controlling and evaluating unit is present, which is configured to control the ultrasonic sensor, to compute the delay times of the ultrasonic pulses from the moments of transmission and the moments of detection of the ultrasonic pulses. The height of an object surface relative to the surface of the conveying device is determined from the delay times of the ultrasonic pulses reflected from the object surface.

The use of ultrasonic sensors for detecting objects has been known for a long time in industrial automation procedures. These sensors enable resolutions to be achieved in the sub-millimeter range. Therefore, in principle, even very thin objects such as sheet metal materials being fed to a press can be monitored and detected.

The determination of the height of an object relative to the surface of a conveying device, particularly in the case of plate-like or sheet-like objects, is tantamount to determining the thickness of the object.

Since the height must be determined by evaluating the ultrasonic delay times relative to a reference variable, that is to say, for example, relative to a surface of the conveying device, the possible resolution and thus the precision of the measurement of the height or thickness also depends, in particular, on the precise extent to which the reference is known.

For example, thermal drifts of the ultrasonic sensor itself or mechanical drifts of the entire mechanical structure can have an adverse effect on this system.

These aspects are of particular significance when very thin objects such as metal sheets or sheets of paper are to be detected.

SUMMARY OF THE INVENTION

The present invention provides a method and an ultrasonic sensor which afford reliable detection of even very thin objects.

In accordance with the present invention, the delay time of the ultrasonic pulses reflected from the surface of the conveying device is stored as a reference value. When there is an increase in the measured delay time from a lower to a higher value, the higher value is stored and used as a new reference value. When there is a decrease in the measured delay time from a higher to a lower value, the lower value is interpreted as the delay time value of ultrasonic pulses reflected from an object surface. The height of the object surface relative to the surface of the conveyor is determined from a difference between the most recently stored reference value and a delay time value relevant to an object surface.

An ultrasonic sensor in accordance with the present invention includes a controlling and evaluating unit that is adapted to store the delay time of the ultrasonic pulses reflected from the surface of the conveying device as a reference value and to determine the height of an object surface relative to the surface of the conveying device from a difference between the most recently stored reference value and the delay time value relevant to the object surface. When there is an increase in the measured delay time from a lower to a higher value, the higher value is used as a new reference value. When there is a decrease in the measured delay time from a higher to a lower value, the lower value is taken to be the delay time value of ultrasonic pulses reflected from an object surface.

In accordance with the present invention, previously known information concerning expected measured values is taken into account when evaluating the ultrasonic delay times.

More precisely, when the measured delay time increases from a lower to a higher value, the new higher value is stored and used as the new reference value. In principle, this is based on the assumption that the objects to be detected have a substantially cuboid or plate-like shape. In the case of such a shape of an object, when there is an increase in the measured delay time, it may be safely assumed that an edge of the object has just left the detection field of the ultrasonic sensor and that the subsequent delay time values can be due to reflections from the surface of the conveying device.

The expression "storing of the delay time" should be taken to have a broad meaning and interpretation for the purposes of the present invention. For example, this expression can include the storage of a variable instead of storing the delay time itself, this variable being related to the delay time, such as the distance or twice the distance, that is the total distance traveled by the ultrasonic pulses.

The position of the ultrasonic sensor relative to the conveying device is merely governed by its ability to transmit the ultrasonic pulses toward the conveying device and the objects disposed thereon. The ultrasonic sensor can be positioned above a conveyor belt and emits the ultrasonic pulses in a downward direction. In principle, however, the ultrasonic sensor can alternatively be disposed to the side of the conveying device, for example. The ultrasonic pulses would then have to be deflected by appropriate means such as reflectors so as to cause them to travel toward the conveying device and the objects to be detected.

One advantage of the invention may be regarded as being the fact that the reference is tracked continually and is therefore known very precisely at any arbitrary point in time.

Accordingly, the distance resolution generally made possible by determining the delay time of ultrasonic pulses can be utilized almost optimally.

Since the reference is known very precisely at any arbitrary point in time in the method according to the invention, the height measurement is equivalent to a measurement of the thickness of the objects to be detected. This basically also reveals information on whether the objects expected in the respective measuring situation or application are located on the conveying device.

The height thus determined can be outputted, for example, as a voltage signal proportional to the height, at an output of the ultrasonic sensor.

The conveying device can basically be any type of device that moves the objects to be detected through a detection field or monitoring area of the ultrasonic sensor appropriately positioned for this purpose. The method of the invention and the ultrasonic sensor of the invention can be used to particular advantage in combination with a conveyor belt.

The controlling and evaluating unit can consist of a microcontroller or functionally comparable and equivalent components, such as programmable logic modules. Portions of the corresponding functionalities of the method of the invention and of the ultrasonic sensor of the invention can, in particular, be incorporated in software for the controlling and evaluating unit.

The software may be programmed in such a way, for example, that the first value obtained after a power-up procedure is used as the reference value. Alternatively, the value stored most recently may be used immediately after the power-up procedure as the reference value.

Due to the concept of the invention of real-time tracking of the reference value, it is also possible to allow for the event of the surface of the conveyor belt moving away from the ultrasonic sensor by (e.g., a few millimeters).

In a variant of the method of the invention, it is also possible to allow for a reduction in the distance between the surface of the conveying device and the ultrasonic sensor. In this respect, it should be noted that according to the invention a decrease in the measured delay time will normally imply that an object is present in the detection field.

Accordingly, in a variant of the method of the invention, in which it is also possible to allow for a reduction in the distance between the surface of the conveying device and the ultrasonic sensor, it is provided that in the case of a decrease in the measured delay time from a higher to a lower value, the lower value is stored and used as the new reference value if the lower value of the delay time is measured for a given number of consecutive measurements.

The number of consecutive measurements, in other words the time elapsed before a lower value of the delay time is used as the new reference value, are advantageously selected such that it can be reliably excluded that an object is still present in the detection field at the normal speed of travel of the objects.

If a maximum expected change in the reference value is smaller than the thickness or height of the objects to be detected, it is additionally advantageous if in the case of a drop in the measured delay time from a higher to a lower value, the lower value is stored and used as the new reference value, if the lower value lies within a range to be set encompassing the most recently stored reference value. This range is then advantageously selected so as to be smaller than the thickness of the objects to be detected.

The functionality of the method of the invention can be further improved if a forward advance signal of the conveying device is signaled to the ultrasonic sensor. For example, the length of an object can be determined from the forward advance speed of the conveying device and a time difference between a decrease and a subsequent increase in the measured delay time.

In order to prevent the erroneous use of a lower delay time value as the new reference value, the forward advance signal of the conveying device can also be taken into account for evaluation. The logic of the controlling and evaluating unit can be programmed in such a way, for example, that a delay time that has dropped to a lower value is not used as the new reference value when the conveying device has come to a halt.

In an embodiment of the method of the invention, the height determined for an object is compared with at least one comparative value and the ultrasonic sensor emits a signal when a deviation found during this comparison is beyond a given range of permissible deviations from the comparative value.

In principle, a comparative value can be determined from heights of objects which have already passed through the detection field of the ultrasonic sensor. Thus, an average value of the heights of a given number of objects that have most recently passed through the detection field can be used as the comparative value, for example.

However, at least one comparative value specific to the objects to be detected can be inputted to the ultrasonic sensor. This then makes it possible to examine, at a very high level of sensitivity, whether the objects being detected are in fact the correct objects for the current application.

In a further variant of the method of the invention, a number of comparative values corresponding to whole-number multiples of a thickness of sheet-like objects are inputted to the ultrasonic sensor. Metal sheets or sheets of paper are examples of such sheet-like objects in this context. It is then possible to reliably detect whether just one of the objects in question or possibly more than one of such sheet-like objects are located in superposition on the conveying device.

Accordingly, the incorrect supply of, say, two superposed metal sheets to a press can be reliably avoided using the method of the invention and the ultrasonic sensor of the invention.

BRIEF DESCRIPTION OF THE DRAWINGS

Additional advantages and features of the method of the invention and the ultrasonic sensor of the invention will be described below with reference to the accompanying figures.

DETAILED DESCRIPTION OF THE INVENTION

In all figures, identical and equivalent components are always designated by the same reference numerals.

FIGS. 1 to 4 each show an ultrasonic sensor 100 positioned above a conveying device 200.

Figure 1:
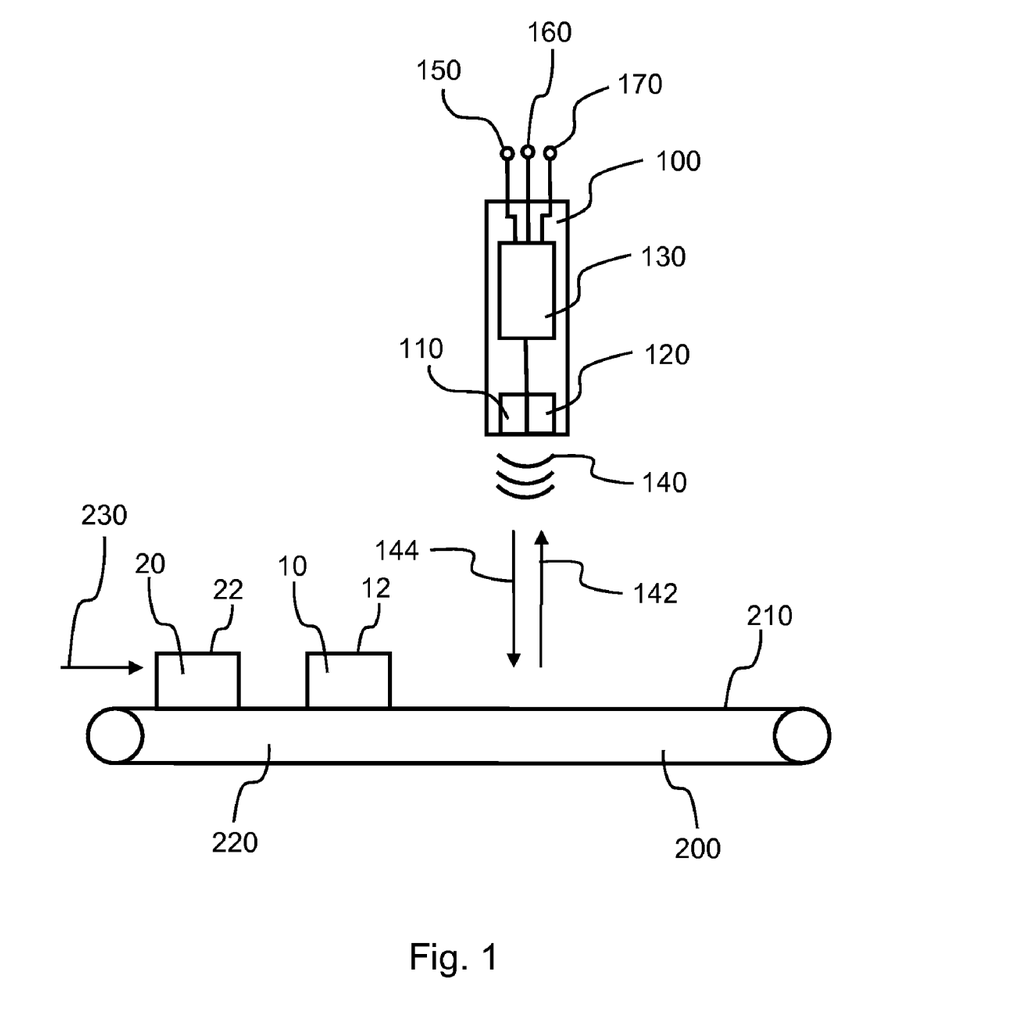
FIGS. 1 to 4 are diagrammatic views of an ultrasonic sensor of the invention in different measuring situations when carrying out the method of the invention at a conveyor belt.
Figure 2:
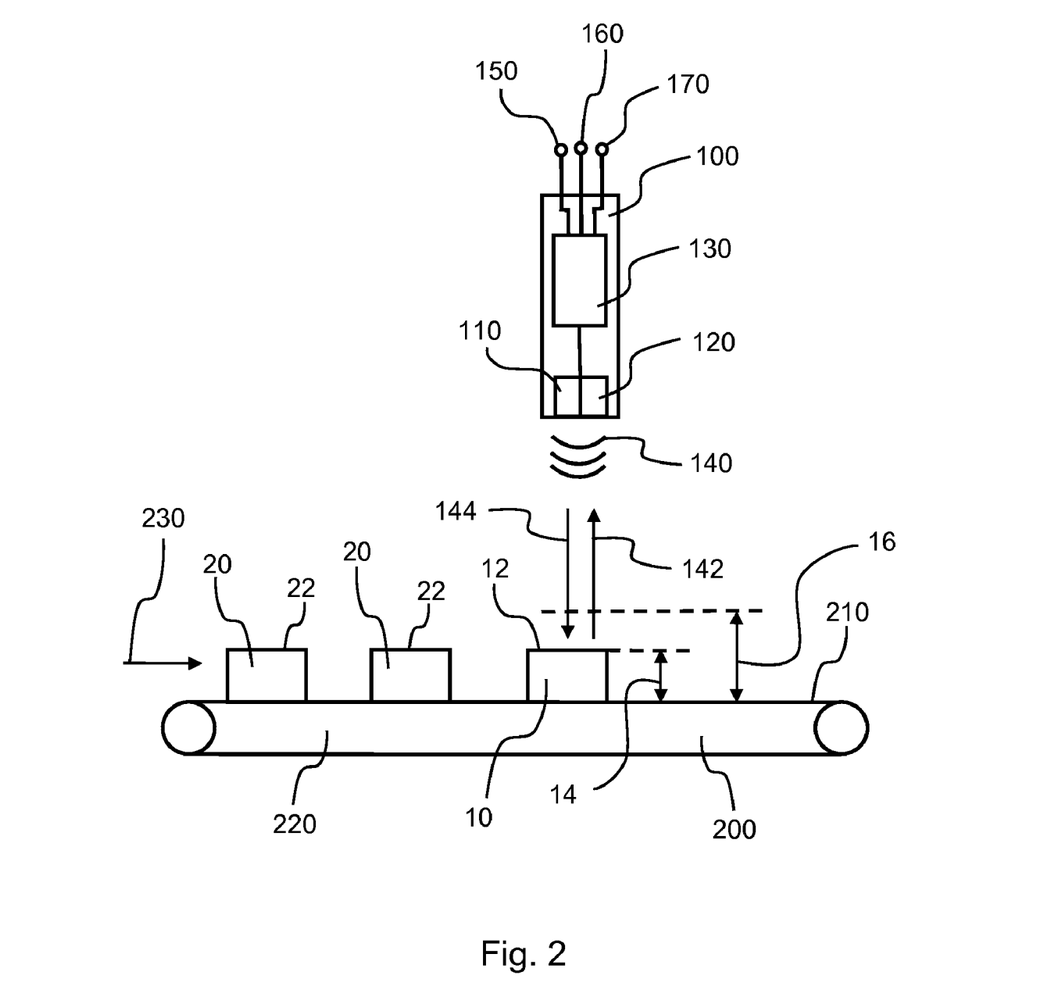
Figure 3:
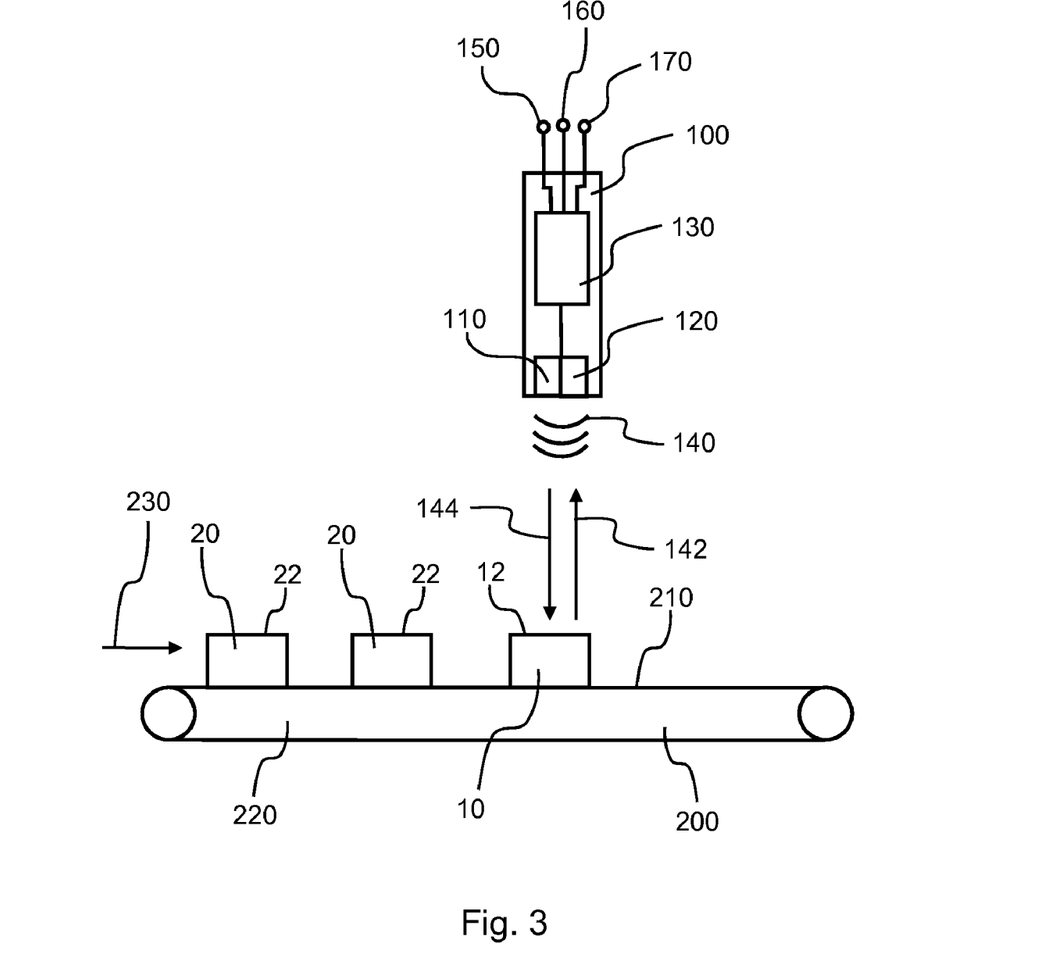
Figure 4:
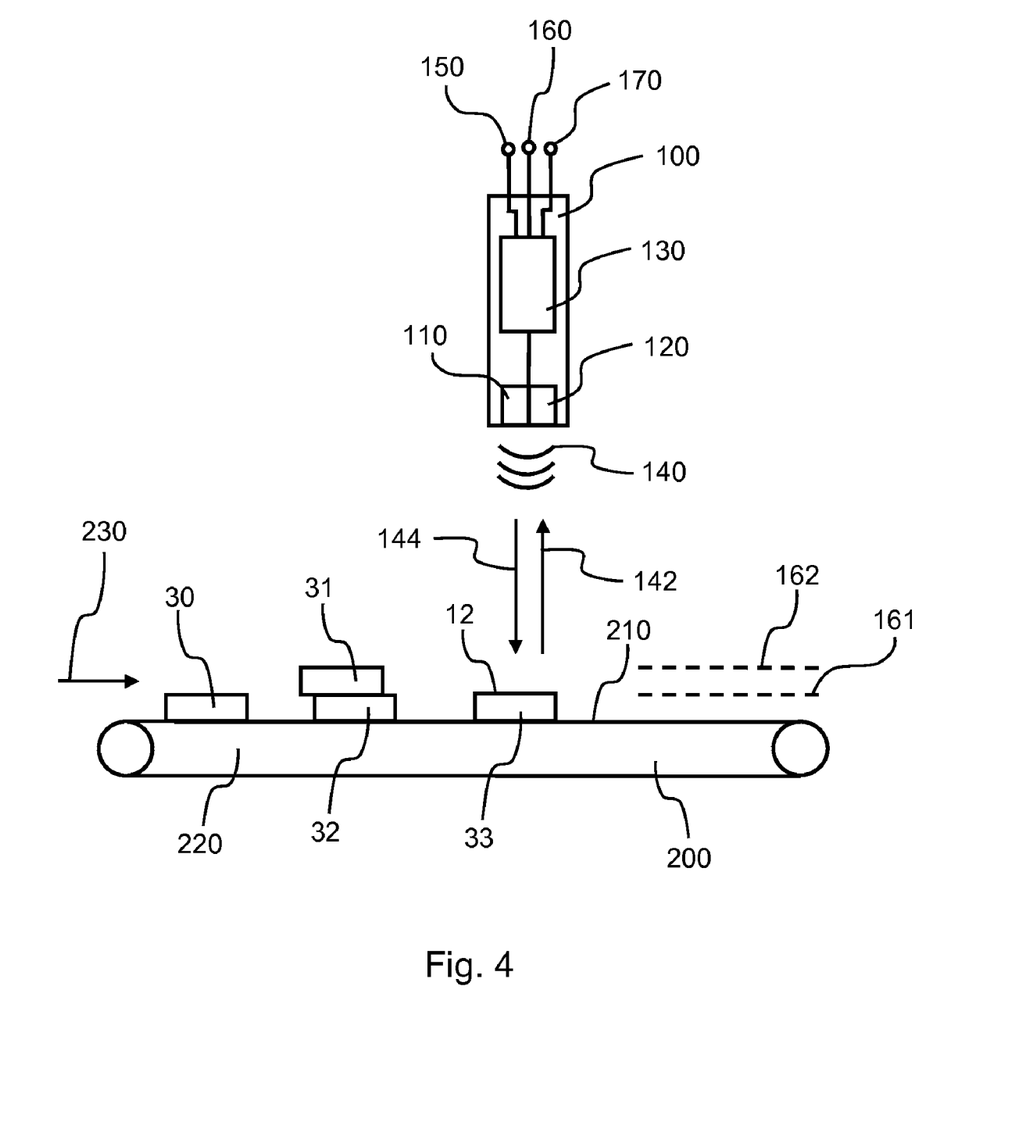

In the situations shown in FIGS. 1 to 3, the conveying device 200, which is a conveyor belt 220 in the exemplary embodiment illustrated, is used for conveying cuboid objects 10, 20 in a direction indicated by the arrow 230, that is from left to right in FIGS. 1 to 3. The objects 10, 20 may be cardboard boxes in which goods are packed, for example.

The ultrasonic sensor 100 includes a transmitter 110, a receiver 120 and a controlling and evaluating unit 130. The transmitter 110 and the receiver 120 can be in the form of a single piezo element, for example. The controlling and evaluating unit 130 is connected to the transmitter 110 and the receiver 120 and comprises diagrammatically illustrated terminals 150, 160, 170. Measuring signals and switching signals of the ultrasonic sensor 100 are made available at the terminals 150, 160. A forward advance signal from the conveying device 200 and/or additional data can be fed to the ultrasonic sensor 100 via the terminal 170, which may be a data interface. When triggered accordingly by the controlling and evaluating unit 130, the transmitter 110 repetitively transmits ultrasonic pulses 140 in the direction 144 toward the conveyor belt 220 and any objects 10, 20 present thereon.

The ultrasonic pulses are reflected from a surface 210 of the conveyor belt 220 or from surfaces 12, 22 of the objects 10, 20 conveyed by the conveyor belt 220 to propagate in the direction 142 toward the receiver 120 for detection. The ultrasonic pulses 140 are reflected from the surface 210 of the conveyor belt 220 in the situation shown in FIG. 1, while in the measuring situations shown in FIGS. 2, 3, and 4, the ultrasonic pulses 140 are reflected from the surface 12 of an object 10, 33.

Figure 5:
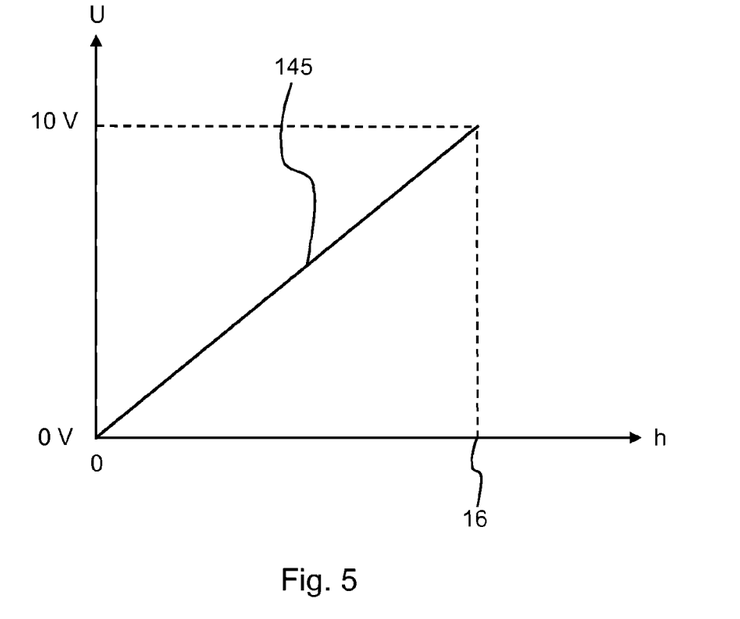
FIG. 5 is a graph of an output signal of the ultrasonic sensor of the invention as a function of a determined object height.

The moments at which the ultrasonic pulses 140 are transmitted by the transmitter 110, and the moments at which the reflected ultrasonic pulses 140 are detected by the receiver 120 are processed in the controlling and evaluating unit 130. The delay times are measured from the transmission and reception moments relevant to the same ultrasonic pulse, by subtraction. By implementation of the speed of sound of the ultrasonic waves, it is then possible to determine the absolute propagation path of the ultrasonic waves equal to twice the distance of the respective reflecting surface from the ultrasonic sensor 100. By determining the distance of the ultrasonic sensor 100 from the object surface 12 and from the surface 210 of the conveyor belt 220 and subtracting one from the other, there is finally obtained a height 14 of the object 10 above the surface 210 of the conveyor belt 220. The height 14 of the object 10 is equal to the thickness of the object 10 relative to the surface 210 of the conveyor belt 220. In the example shown in the Figures, a voltage proportional to this height 14 is outputted at the output 160. A voltage wedge 145, which demonstrates the proportional correlation of heights ranging from 0 to height 16, which may be 30 mm for example, against voltages ranging from 0 to 10 Volts, is diagrammatically shown in FIG. 5.

This scaling of the output voltage can be adapted, as needed, to the desired application and to the instruments used in each case.

In accordance with the present invention, the ultrasonic sensor 100 automatically references and calibrates itself to the surface 210 of the conveyor belt 220 as a result of the features set forth in the claims. The delay time between the ultrasonic sensor 100 and the surface 210 of the conveyor belt 220 is measured continually and, in the example illustrated, zero volts are outputted at output 160 if no object 10 is present between the ultrasonic sensor 100 and the conveyor belt 220. This allows for a compensation of temperature and mechanical drifts. When the object 10, starting from the situation shown in FIG. 1, moves into the detection field of the ultrasonic sensor 100 from the left, the delay time detected by the ultrasonic sensor 100 will drop from a higher value, namely a value relevant to the surface 210 of the conveyor belt 220, to a lower value relevant to the surface 12 of the object 10. According to the invention, this is interpreted by the controlling and evaluating unit 130 as a change generated by the object and, as described above, the height 14 of the object 10 above the surface 210 of the conveyor belt 220 is accordingly outputted at the output 160 of the ultrasonic sensor 100 as a proportional voltage signal.

A functionality of the ultrasonic sensor 100 of the invention and the method of the invention consists in that in the case of a rise in the measured delay time from a lower to a higher value, this higher value is stored as the new reference and used for subsequent height determination.

This may be the case, for example, if, starting from the situation shown in FIG. 2, the object 10 moves further toward the right and finally out of the detection field of the ultrasonic sensor 100. The ultrasonic sensor 100 of the invention then rapidly readjusts to its distance from the surface 210 of the conveyor belt 220 as the new reference value. Using the method of the invention, the height or thickness of the objects 10 and 20 are determined, for this reason, by way of different reference values. Possible deviations or drifts that may occur in the brief period of time in which the object 10 moves out of the detection field and the next object 20 moves into the detection field of the ultrasonic sensor 100 are thus compensated for or eliminated.

In principle, the distance between the ultrasonic sensor 100 and the surface 210 of the conveyor belt 220 may shorten due to thermal or mechanical drifts, resulting in a shorter delay time of the ultrasonic pulses. According to the invention, such a lower value of the delay time is initially assigned to an object. There are ways of deriving a new reference value also from a lower delay time value.

Firstly, information concerning the speed of motion of the objects to be detected relative to the ultrasonic sensor 100 can be used to determine a time constant. After the lapse of this determined period of time, or equivalently a given number of consecutive measurements, the shorter delay time value is stored and used as the new reference. The voltage then again drops to zero at output 160.

Figure 6:
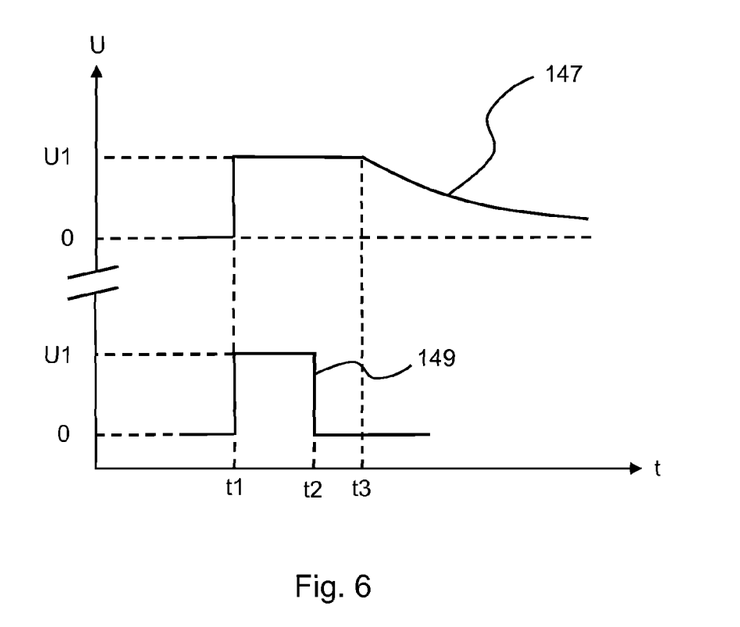
FIG. 6 is a graph showing a time profile of the output signal of the ultrasonic sensor for two different measuring situations.

Illustrative corresponding time profiles of the voltage at output 160 of the ultrasonic sensor 100 are shown diagrammatically in FIG. 6. The curve 147 represents the time profile resulting if the conveyor belt 220 is stopped and the object 10 accordingly stands at a halt below the ultrasonic sensor 100. In the case of a normal advance of the conveyor belt 220, a voltage characteristic corresponding to the curve 149 is outputted at output 160.

Alternatively or additionally, a distance that has decreased to a lower value may be compared with a comparative value, and for example, only values differing from the hitherto used reference value by less than a given maximum deviation can be permitted as new reference values.

The method of the invention and the ultrasonic sensor 100 of the invention also make it possible, to particular advantage, to detect very thin materials such as very thin metal sheets or sheets of paper. This is described in more detail with reference to FIG. 4. The objects 30, 31, 32, 33 shown in FIG. 4 and to be detected are, for example thin metal sheets. The two metal sheets 31, 32 are superposed, which is undesirable and can be determined using the ultrasonic sensor 100 of the invention. Due to the continual tracking of the reference value, it is possible to determine the thickness or, tantamount thereto, the height of the objects above the surface 210 of the conveyor belt 220 extremely accurately within a resolution of up to 0.17 mm, for example. By the selective adjustment of the scaling procedure described above and by setting suitable comparative thresholds 161, 162, the measuring situations "no material", "single-ply material", and "double-ply material" can be differentiated reliably by comparing the determined thicknesses with the values 161 and 162. For example, if a double-ply material is detected, as in the case of the metal sheets 31, 32, an appropriate error signal can be outputted at the switching output 150.

The present invention provides a novel method for measuring the thickness of objects disposed on a conveying device and a novel ultrasonic sensor, which makes it possible to continually recalibrate the reference value in the ongoing measuring mode, to reliably detect very thin objects, and in particular, to identify double ply materials.

While the present invention has been described with respect to various embodiment thereof, it is not limited to the scope described above with respect to these embodiments. It is, therefore, to be understood that various changes and medications of the above-described embodiments will readily occur to those skilled in the art. It is apparent from the description in the appended claims that other embodiments of the invention provided by making such changes and modifications are also included in the technical scope of the present invention.

The invention claimed is:

1. A method for determining a height of objects disposed on a conveying device, wherein an ultrasonic sensor positioned in relation to the conveying device transmits repetitively ultrasonic pulses directed toward the conveying device and any detectable objects disposed thereon, and the ultrasonic pulses are reflected from a surface of the conveying device or surfaces of the detectable objects and are detected by the ultrasonic sensor, wherein delay times of the ultrasonic pulses are determined from moments of transmission and moments of detection of the ultrasonic pulses, and a height of an object surface relative to the surface of the conveying device is determined from the delay times of the ultrasonic pulses reflected from an object surface, wherein the delay time of the ultrasonic pulses reflected from the surface of the conveying device is stored as a reference value, when there is an increase in the measured delay time from a lower to a higher value, the higher value is stored and used as a new reference value, when there is a decrease in the measured delay time from a higher to a lower value, the lower value is interpreted as the delay time value of ultrasonic pulses reflected from an object surface, and the height of the object surface relative to the surface of the conveying device is determined from a difference between a most recently stored reference value and a delay time value relevant to an object surface.

2. The method as defined in claim 1,
wherein
when there is a decrease in the measured delay time from a higher to a lower value, the lower value is stored and used as a new reference value when the lower value of the delay time is measured for a given number of consecutive measurements.

3. The method as defined in claim 1,
wherein
when there is a decrease in the measured delay time from a higher to a lower value, the lower value is stored and used as a new reference value when the lower value lies within a given range encompassing a most recently stored reference value.

4. The method as defined in claim 1,
wherein
the conveying device is a conveyor belt.

5. The method as defined in claim 1,
wherein
a forward advance signal of the conveying device is fed to the ultrasonic sensor and a length of the object is determined from a forward advance speed of the conveying device and a time difference between a decrease and subsequent increase in the measured delay time.

6. The method as defined in claim 1,
wherein
the height determined for an object is compared with at least one comparative value and the ultrasonic sensor generates a signal if the comparison yields a deviation beyond a given range of permitted deviations from the comparative value.

7. The method as defined in claim 6,
wherein
the comparative value is determined from heights of objects that have already been detected within a detection field of the ultrasonic sensor.

8. The method as defined in claim 6,
wherein
at least one comparative value specific to the objects to be detected is fed to the ultrasonic sensor.

9. The method as defined in claim 6,
wherein
a plurality of comparative values are fed to the ultrasonic sensor, the plurality of comparative values being whole number multiples of a thickness of sheet-like objects.

10. An ultrasonic sensor for determining a height of objects disposed on a conveying device, comprising:

a transmitter for repetitive emission of ultrasonic pulses, a receiver for reception of ultrasonic pulses which have been reflected from a surface of the conveying device or from surfaces of the objects to be detected, and a controlling and evaluating unit for controlling the transmitter, for computing delay times of the ultrasonic pulses from moments of transmission to moments of detection of the ultrasonic pulses, and for determining a height of an object surface relative to the surface of the conveying device from delay times of the ultrasonic pulses reflected from the object surface, wherein the controlling and evaluating unit stores the delay time of the ultrasonic pulses reflected from the surface of the conveying device as a reference value and determines the height of an object surface relative to the surface of the conveying device from a difference between a most recently stored reference value and the delay time value relevant to the object surface, and when there is an increase in the measured delay time from a lower to a higher value, the higher value is used as a new reference value, and when there is a decrease in the measured delay time from a higher to a lower value, the lower value is taken to be the delay time value of ultrasonic pulses reflected from an object surface.

* * * * *